US011732657B2

(12) United States Patent
Demers et al.

(10) Patent No.: US 11,732,657 B2
(45) Date of Patent: Aug. 22, 2023

(54) METHODS AND SYSTEMS FOR OPERATING AN ENGINE TO GENERATE ADDITIONAL THRUST

(71) Applicant: PRATT & WHITNEY CANADA CORP., Longueuil (CA)

(72) Inventors: Francis Demers, Longueuil (CA); Cristina Crainic, Longueuil (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 28 days.

(21) Appl. No.: 17/401,403

(22) Filed: Aug. 13, 2021

(65) Prior Publication Data

US 2023/0046718 A1 Feb. 16, 2023

(51) Int. Cl.
*F02C 9/18* (2006.01)
*F01D 11/20* (2006.01)

(52) U.S. Cl.
CPC ............... *F02C 9/18* (2013.01); *F01D 11/20* (2013.01); *F05D 2220/32* (2013.01); *F05D 2270/051* (2013.01)

(58) Field of Classification Search
CPC .................................. F01D 11/20; F02C 9/18
See application file for complete search history.

(56) References Cited

U.S. PATENT DOCUMENTS

| 2006/0101826 | A1 | 5/2006 | Martis et al. |
| 2007/0214795 | A1 | 9/2007 | Cooker et al. |
| 2011/0077895 | A1* | 3/2011 | Muramatsu ............... G01K 7/42 374/135 |
| 2015/0247417 | A1* | 9/2015 | Bacic ................... F04D 27/001 415/30 |
| 2017/0167273 | A1* | 6/2017 | Maguire ................. F01D 25/24 |
| 2020/0131997 | A1 | 4/2020 | Hanlon et al. |
| 2021/0131352 | A1 | 5/2021 | Pascu et al. |

FOREIGN PATENT DOCUMENTS

EP 3450729 3/2019

* cited by examiner

*Primary Examiner* — Katheryn A Malatek
(74) *Attorney, Agent, or Firm* — Norton Rose Fulbright Canada LLP

(57) ABSTRACT

Methods and systems for operating an engine, the engine having an engine core, an exhaust nozzle, and variable geometry mechanisms, are provided. A request for an increase in thrust generated by the engine is received. In response to receipt of the request, it is determined that at least one operating condition for engine degradation thrust is met. In response to this determination, the variable geometry mechanisms are modulated to degrade an efficiency of the engine, thereby increasing a temperature of core air flowing through the engine core. The increase in thrust is generated from the increased temperature of the core air flowing through the engine core and into the exhaust nozzle.

18 Claims, 7 Drawing Sheets

METHODS AND SYSTEMS FOR OPERATING AN ENGINE TO GENERATE ADDITIONAL THRUST

TECHNICAL FIELD

The application relates generally to gas turbine engines, and, more particularly, to systems and methods for generating additional thrust in a gas turbine engine.

BACKGROUND OF THE ART

Gas turbine engines, for instance turbofan engines, may be provided with high bypass ratios for increased propulsive efficiency and reduced fuel consumption. However, when an aircraft is provided with an engine with a high bypass ratio, there may be a measurable difference between the thrust provided at take-off and the thrust provided while climbing and at higher altitudes. For instance, the flow of gases through the exhaust nozzle may be choked (i.e. flowing at the speed of sound), preventing further thrust from being provided. If the mechanical limit of the fan has been reached, for instance while the aircraft is climbing or has reached a high altitude, it cannot rotate any faster to provide a desired increase in thrust.

Therefore, improvements are needed.

SUMMARY

In accordance with a broad aspect, there is provided a method for operating an engine, the engine having an engine core, an exhaust nozzle, and variable geometry mechanisms. A request for an increase in thrust generated by the engine is received. In response to receipt of the request, it is determined that at least one operating condition for engine degradation thrust is met. In response to this determination, the variable geometry mechanisms are modulated to degrade an efficiency of the engine, thereby increasing a temperature of core air flowing through the engine core. The increase in thrust is generated from the increased temperature of the core air flowing through the engine core and into the exhaust nozzle.

In another broad aspect, there is provided a system for operating an engine, the engine having an engine core, an exhaust nozzle, and variable geometry mechanisms. The system comprises a processing unit, and a non-transitory computer-readable medium communicatively coupled to the processing unit. The computer-readable medium comprises computer-readable program instructions executable by the processing unit for: receiving a request for an increase in thrust generated by the engine; in response to receipt of the request, determining that at least one operating condition for engine degradation thrust is met; in response to the determining, modulating the variable geometry mechanisms to degrade an efficiency of the engine, thereby increasing a temperature of core air flowing through the engine core; and generating the increase in thrust from the increased temperature of the core air flowing through the engine core and into the exhaust nozzle.

DESCRIPTION OF THE DRAWINGS

Reference is now made to the accompanying figures in which.

DETAILED DESCRIPTION

Figure 1:
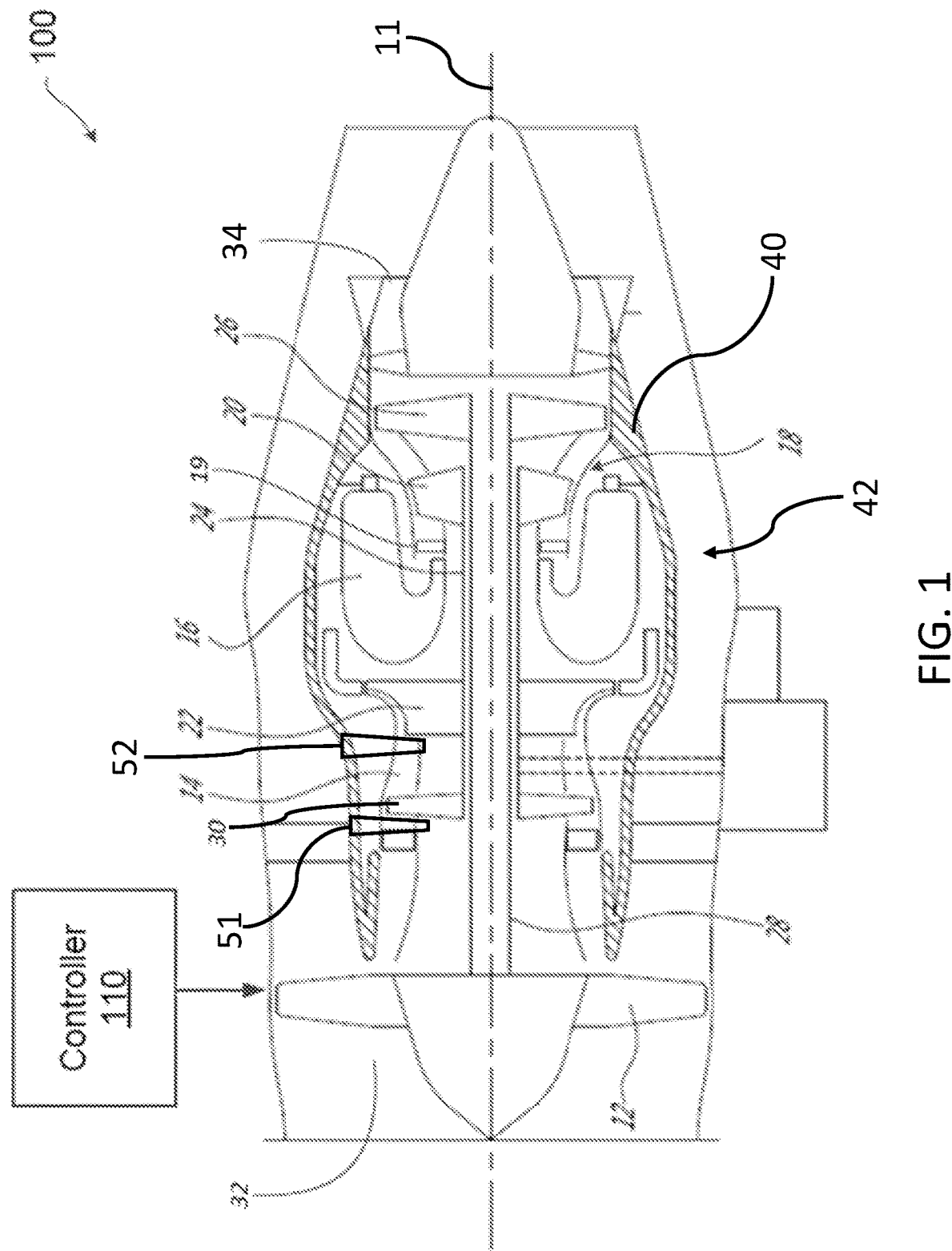
FIG. 1 is a schematic cross sectional view of a gas turbine engine.

The present disclosure is directed to methods and systems for operating an engine. FIG. 1 illustrates an example engine 100 of a type provided for use by an aircraft in subsonic flight. The engine 100 of FIG. 1 is a turbofan engine that generally comprises, in serial flow communication, a fan 12 through which ambient air is propelled toward an inlet 32, a compressor section 14 for pressurizing the air, a combustor 16 in which the compressed air is mixed with fuel and ignited for generating an annular stream of hot combustion gases, and a turbine section 18 for extracting energy from the combustion gases, which exit via an exhaust nozzle 34. High-pressure rotor(s) of the turbine section 18 (referred to as "HP turbine 20") are mechanically linked to high-pressure rotor(s) of the compressor section 14 (referred to as "HP compressor 22") through a high-pressure shaft 24. The turbine section 18 includes a vane 19 between the combustor 16 and the HP turbine 20.

Although the engine 100 is described herein for flight applications, it should be understood that other uses, such as industrial or the like, may apply.

Figure 2:
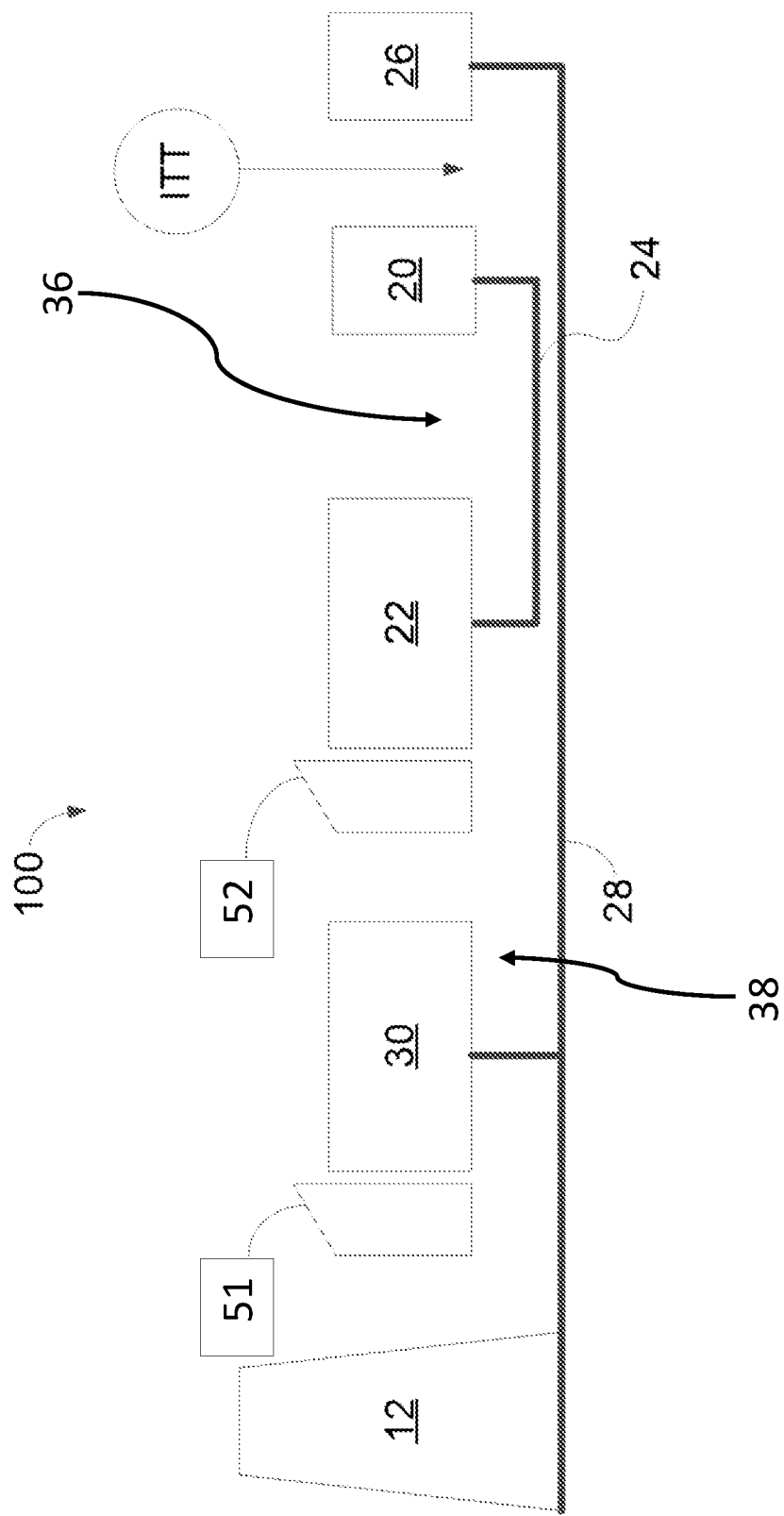
FIG. 2 is simplified schematic view of the engine of FIG. 1.

Referring additionally to FIG. 2, according to the illustrated example, the engine 100 is provided in the form of a multi-spool engine having a high pressure (HP) spool 36 and a low pressure (LP) spool 38 independently rotatable about axis 11. However, it is understood that a multi-spool engine could have more than two spools. It should also be noted that the embodiments described herein also consider the use of single-spool engines.

Low-pressure rotor(s) of the turbine section 18 (referred to as "LP turbine 26") are mechanically linked to the low-pressure rotor(s) of the compressor section 14 (referred to as "LP compressor 30") and/or the fan 12 through a concentric low-pressure shaft 28 (referred to as an "LP shaft 28") extending within the high-pressure shaft 24 and rotating independently therefrom. The high pressure components (HP turbine 20, HP compressor 22, HP shaft 24) form the high pressure spool 36 (referred to as "HP spool 36"), while the low pressure components (LP turbine 26, LP shaft 28, LP compressor 30) form the low pressure spool 38 (referred to as "LP spool 38"). In the shown embodiment, the fan 12 extends forwardly from the LP shaft 28 and is mechanically coupled thereto to be driven by the LP turbine 26. The rotational speed of the fan 12, generally referred to as N1, is thus limited by the rotational speed of the LP spool 38. The compressor section 14, combustor 16 and turbine section 18 are contained within an engine core 40 surrounded by a bypass duct 42 carrying bypass air generated by the fan 12.

Control of the operation of the engine 100 can be effected by one or more control systems, for example a controller 110, which is communicatively coupled to the engine 100. The operation of the engine 100 can be controlled by way of one or more actuators, mechanical linkages, hydraulic systems, and the like. The controller 110 can be coupled to the actuators, mechanical linkages, hydraulic systems, and the like, in any suitable fashion for effecting control of the engine 100. The controller 110 can modulate the position and orientation of variable geometry mechanisms within the engine 100, the bleed level of the engine 100, and fuel flow, based on predetermined schedules or algorithms. In some embodiments, the controller 110 includes one or more FADEC(s), electronic engine controller(s) (EEC(s)), or the like, that are programmed to control the operation of the engine 100.

Engine 100 may operate with a high bypass ratio, i.e. a ratio of the mass flow rate through the bypass duct 42 to the mass flow rate entering the engine core 40, for instance to increase propulsive efficiency and thus reduce fuel consumption. One of the drawbacks of increasing the engine bypass ratio is it suffers from a greater difference between the maximum thrust available at take-off and the maximum thrust available at maximum climb due to the reduced jet velocity. This may result in a choked flow at the exhaust nozzle 34, whereby the flow is travelling at the speed of sound (Mach 1). At such speeds, the fan 12 may have reached its mechanical limit (rotating at a maximum rotational speed of the LP spool 38), for instance while the aircraft is climbing or flying at high altitudes, and may not be able to rotate any faster to increase thrust.

As such, the present disclosure describes systems and methods for providing additional thrust to the engine 100 in certain circumstances, by modulating variable geometry mechanisms (VGMs) of the engine 100 to degrade the efficiency of the engine 100 and thereby increase the temperature of gases travelling through the engine core 40 and into the exhaust nozzle 34. For example, core air may be drawn from various locations in the engine core 40, and redirected into the bypass duct 42, thereby causing the engine 100 to work harder, which leads to an increase in fuel flow, core temperature and core exit temperature. In addition, the mixing of the hotter core flow and the hotter bypass flow at the exhaust nozzle 34 increases the average temperature at the exhaust nozzle 34, which increases fuel velocity and hence thrust. In other cases, other VGM's may be modulated to decrease the efficiency of the engine 100 to cause the engine core 40 to work harder, thereby increasing the temperature of the air flowing through the engine core 40 and into the exhaust nozzle 34. As used herein, VGMs are used to designate any component of the engine 100 having a geometry, i.e. a position, variable between at least two positions, such as but not limited to valves (e.g. bleed-off valves, on-off valves, controllable valves), vanes (e.g. inlet guide vanes, guide vanes, stator vanes, outlet guide vanes), blade tip spacing (e.g. turbine blade tips spacing, rotor blade tips spacing), and the like.

In some embodiments, and as shown in FIG. 1, LPC bleed valves 51 such as bleed off valves (BOVs) may be used at the outlet of the LP compressor 30, and HPC bleed valves 52 may be used at the outlet of the HP compressor 22. Other means for bleeding air from the engine core 40, such as inter-stage bleed valves, for instance HPC bleed valves 52 positioned between stages of the HP compressor 22, may be contemplated as well. In various embodiments, bleed valves may be positioned at various positions upstream or downstream of the LP compressor 30 or HP compressor 22, respectively. Additionally or alternatively, variable inlet guide vanes (VIGV) may be used at the inlet of the LP compressor 30, and variable guide vanes (VGV) may be used at the inlet of the HP compressor 22 or between stages of the HP compressor 22 to temporarily degrade the performance of engine 100 to provide additional thrust. By temporarily degrading the performance of the engine 100, the gas temperature at the exhaust nozzle 34 may increase, thereby increasing the velocity of the gas at the exhaust nozzle 34 and allowing the engine 100 to provide additional thrust. The increase in thrust may thus be generated from an increase in temperature of the air flowing through the engine core 40 and into the exhaust nozzle 34. In various cases, the degrading may be scheduled to occur for limited sets of operating conditions and therefore have a negligible impact on engine life and performance.

Figure 3:
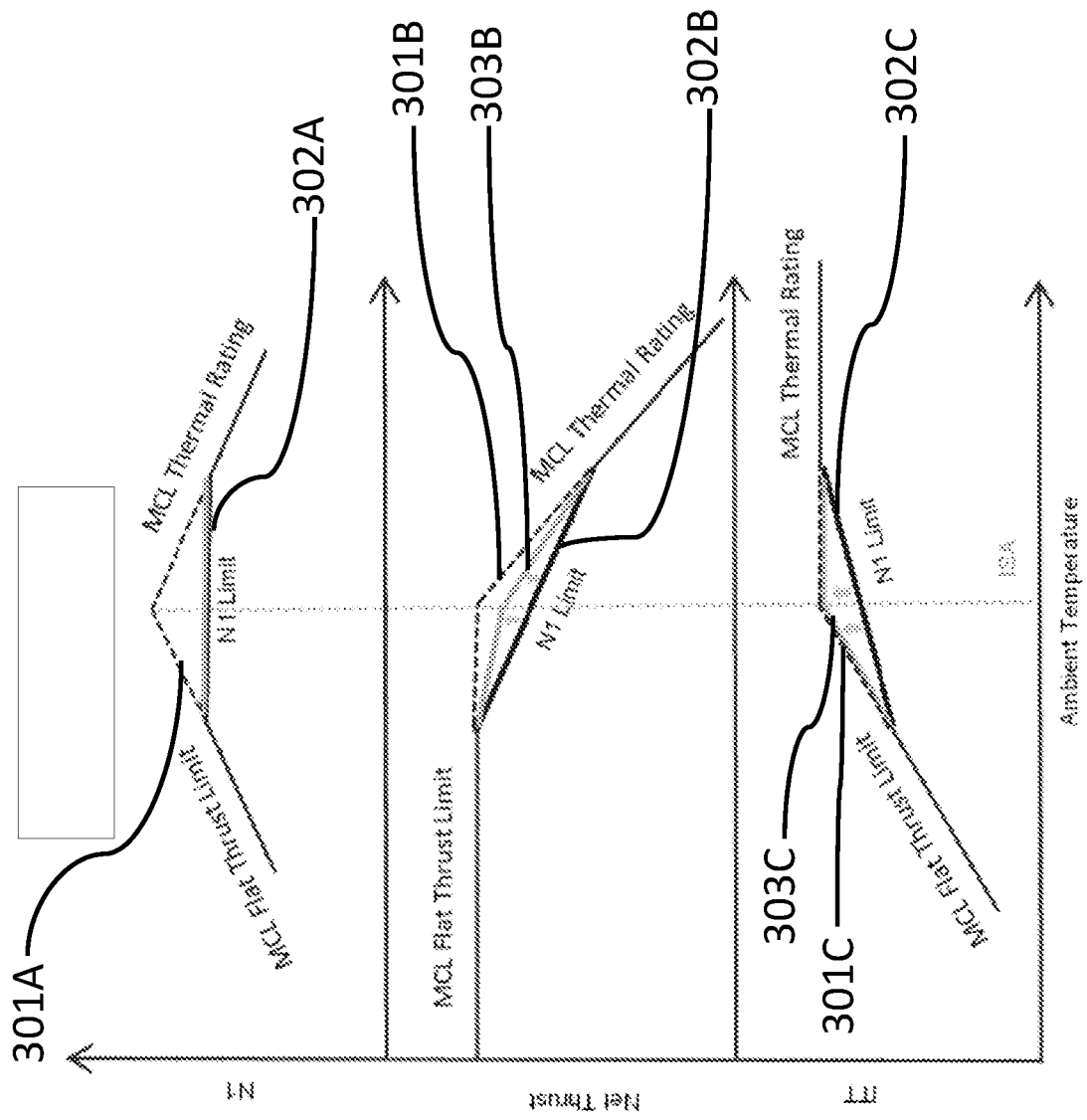
FIGS. 3A-3C are graphical representations of various engine parameters.

Referring to FIGS. 3A-3C, there are shown three graphs depicting the effects of degrading engine efficiency through VGM modulation, for example by bleeding additional air into the bypass duct 42. VGM modulation is done at a constant rotational speed (N1) of the fan 12 to increase exhaust gas temperature (EGT) and thus provide additional thrust. EGT refers to the temperature of the gas leaving the engine core 40 at the exhaust nozzle 34. FIG. 3A illustrates N1 relative to ambient temperature. FIG. 3B illustrates net thrust relative to ambient temperature. FIG. 3C illustrates inter-turbine temperature (ITT—also called inter-stage turbine temperature) relative to ambient temperature. As used herein, ITT refers to the temperature of the gases in the engine core 40 between the high pressure turbine 20 and the low pressure turbine 26, as illustrated in FIG. 2. It will be understood that the use of ITT in this example is merely to indicate a temperature for which a thermal limit is reached. In some embodiments, ITT may be replaced with a surrogate or adjacent temperature, such as T4 (found at the exit of the combustor 16/turbine nozzle guide vane) or T41 (the first stator outlet temperature). In each of FIGS. 3A-3C, the values for N1, net thrust and ITT, respectively, in an ideal scenario are represented by dotted lines 301A, 301B, 301C. As shown, these values are each limited by the mechanical N1 limit, represented by lines 302A, 302B, 302C, respectively. However, by bleeding additional air into the bypass duct, net thrust can be increased to line 303B. As a result of the additional air bled into the bypass duct, the ITT also increases to line 303C, which approaches the ideal value for ITT 301C if not for the mechanical N1 limit. As shown in FIG. 3A, N1 does not change after bleed is initiated due to the mechanical N1 limit already being reached. Thus, by bleeding additional air into the bypass duct 42, the EGT of the engine 100 may be increased while maintaining a constant N1, thus increasing the net thrust being provided.

Referring again to FIGS. 1 and 2, air may be bled to the bypass duct 42 from a variety of bleed valves positioned at various locations in the engine core 40, for instance LPC bleed valves at the outlet of the LP compressor 30. In other embodiments, the VGM's which may be modulated to temporarily degrade the engine's performance may be one or more VIGVs 51 at the inlet of the LP compressor 30 and/or one or more VGVs 52 at the inlet of the HP compressor 22. Other VGMs may be contemplated as well. In some embodiments, two or more VGM modulations may be used to degrade the engine's performance. Various combinations of degradation methods, for instance VIGV's and bleed valves, may be contemplated as well.

In some embodiments, low pressure compressor bleed air from the LP spool 38 may be discharged into the bypass duct 42 to force the engine core 40 to work harder. In some embodiments, an LPC bleed valve positioned immediately downstream of the LP compressor 30 may be used to divert air into the bypass duct 42. In other embodiments, as shown in FIG. 2, one or more VIGVs 51 positioned at the inlet of the LP compressor 30 may be selectively modulated to degrade the efficiency of the LP compressor 30. The operation of the VIGVs 51 or other suitable VGM's may be controlled by controller 110 and may be operated via active or passive control, as will be discussed in further detail below. Other VGM's at the inlet of the LP compressor 30 may be contemplated as well.

Still referring to FIG. 2, high pressure compressor bleed air from the HP spool 36 may be bled into the bypass duct 42. One or more VGVs 52 positioned at the HP compressor 22 may be selectively modulated to degrade the efficiency of the HP compressor 22. The operation of the VGVs 52 or other suitable VGM's may be controlled by controller 110 and may be operated via active or passive control, as will be discussed in further detail below. Other VGM's at the inlet of the HP compressor 22 may be contemplated as well. In other cases, the efficiency of the HP compressor 22 or the HP turbine 20 may be degraded by increasing a gap between tips of the blades of the HP compressor 22 or HP turbine 20 and a surrounding casing in the HP spool 36 (i.e. active tip clearance control).

Figure 4:
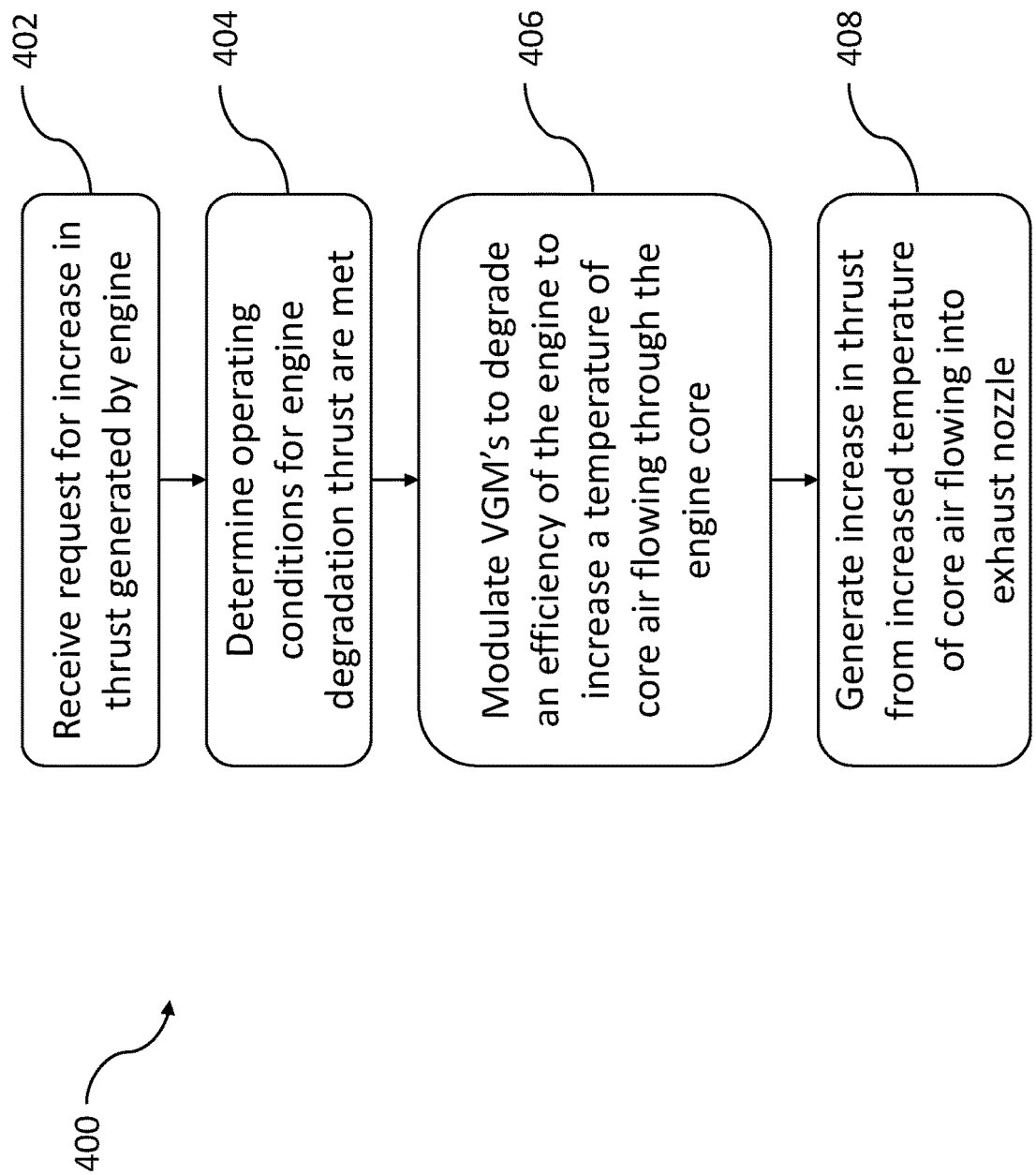
FIG. 4 is a flowchart illustrating an example method for operating the engine of FIG. 1.

Referring to FIG. 4, there is shown an exemplary method 400 for operating an engine 100 to provide additional thrust in certain circumstances, the engine having an engine core 40, a bypass duct 42, an exhaust nozzle 34 and variable geometry mechanisms as described above. Such method may be performed by the controller 110 in part or in whole.

At step 402, a request is received for an increase in thrust generated by the engine 100. In other words, the engine 100 is currently producing a given amount of thrust and the request is for more than the given amount of thrust. The request may come from a power lever of an aircraft, a thrust lever of the aircraft, a combined lever of the aircraft, or any other control mechanism operated by a pilot of the aircraft. In some embodiments, the request is generated by the controller 110 or another controller or computing device, such as an aircraft computer, in response to a detected state of the engine 100 or detected operating conditions of the aircraft.

At step 404, in response to the receipt of the request at step 402, it is determined if at least one operating condition for engine degradation thrust is met. As used herein, engine degradation thrust refers to providing additional thrust through engine degradation as described herein, i.e by modulating one or more VGM of the engine to increase EGT. It will be understood that engine degradation thrust differs from other techniques for increasing thrust, such as increasing the speed of the fan or the use of an afterburner. In some embodiments, engine degradation thrust may be used in combination with other techniques for increasing engine thrust. In some embodiments, the operating condition for engine degradation thrust is a choked state of the exhaust nozzle. In some embodiments, the operating condition for engine degradation thrust is a choked state of the exhaust nozzle when the fan 12 is operating at its mechanical limit. In some embodiments, a choked state of the exhaust nozzle 34 is predetermined and step 404 comprises confirming the choked state of the exhaust nozzle 34 by reading a flag or field having been set as a result of the predetermined choked state of the exhaust nozzle 34. In some embodiments, the operating conditions for engine degradation are independent of the choked state of the exhaust nozzle and instead relate to other engine and/or aircraft parameters, for example an available ITT margin as determined from an ITT measurement. The controller 110 may consider one or more of a minimum aircraft attitude, a Mach number, a rotational speed of the fan 12, an inlet total pressure, an ITT measurement, and a flight phase to determine whether at least one operating condition for engine degradation thrust is met.

At step 406, when the one or more operating condition is met, one or more variable geometry mechanisms are modulated to degrade an efficiency of the engine 100 to increase a temperature of core air flowing through the engine core 40. In some cases, step 406 comprises degrading the efficiency of one or more components of the engine 100. In some cases, step 406 comprises core air being discharged from the engine core 40 into the bypass duct 42 by modulating the one or more variable geometry mechanisms. In some embodiments, step 406 comprises one or more of discharging high pressure compressor bleed air into the bypass duct 42, discharging high pressure compressor bleed air into the bypass duct 42, or increasing a gap between tips of high pressure turbine 20 blades and a surrounding casing, as discussed above. In various cases, modulating the variable geometry mechanisms may include modulating the low pressure compressor bleed valve and/or the high pressure compressor bleed valve, as discussed above.

At step 408, the increase in thrust is generated from an increase in temperature of the core air flowing through the engine core 40 and into the exhaust nozzle 34.

Figure 5:
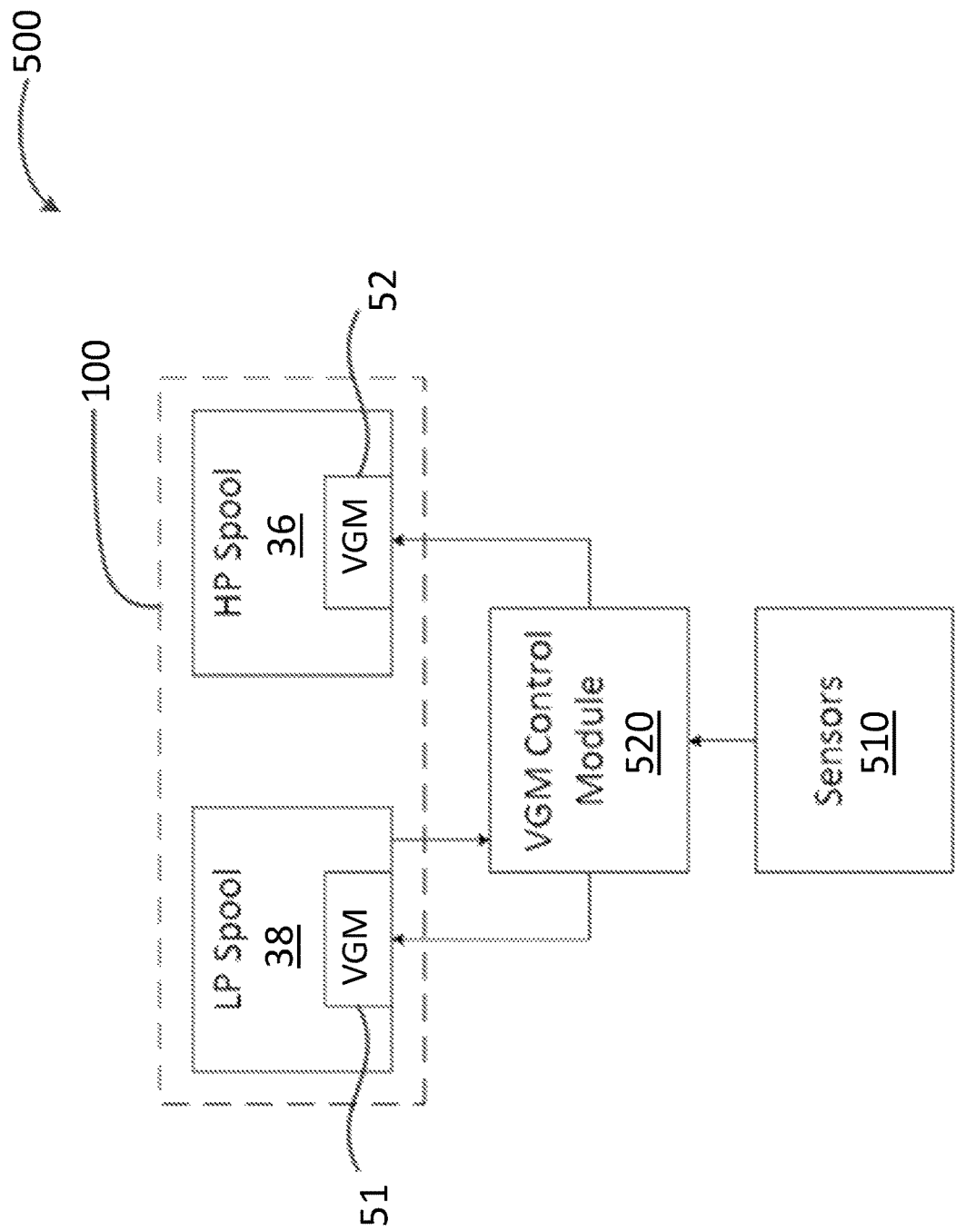
FIG. 5 is a block diagram of an example engine system for modulating VGMs.

Referring to FIG. 5, there is illustrated an engine system 500, which is composed of the engine 100, a plurality of sensors 510 and a VGM control module 520. It should be understood that certain elements of the engine 100, as shown in FIG. 5, are omitted to facilitate understanding.

As is described in greater detail hereinbelow, the sensors 510 are configured for detecting various parameters for the engine 100 and/or for one of the spools 36, 38. While the sensors 510 are shown as being external to the engine 100, it should be understood that one or more of the sensors 510 form part of the engine 100. In various embodiments, the number, type and positioning of the sensors 510 may vary. The sensors 510 may be operable to determine that one or more operating condition for a choked state of the exhaust nozzle 34 are met, for instance by detecting one or more of a minimum aircraft altitude, a Mach number, a rotational speed of the engine 100, or a flight phase. As such, the sensors 510 may include altimeters, speed sensors, gyroscopes, as well as others types of sensors. Additionally, although illustrated here as physical sensors that are located at particular locations, it should be understood that in some cases, one or more of the sensors 510 can be virtual sensors, that is to say, instruments which make use of measurements from other sensors (physical or virtual) to derive a desired parameter.

The VGM control module 520 may form part of the controller 110 and be operable to control the VGMs 51, 52 based on, inter alia, information acquired from the sensors 510, which can include altering a position and/or orientation of the VGMs 51, 52 to increase the quantity of bleed air directed into the bypass duct 42. The VGM control module 520 may also be configured for controlling a gap between the tips of the blades in the HP turbine 20 and a surrounding casing, for instance to increase the gap in order to degrade the performance of the HP turbine 20. As discussed above, degrading engine efficiency, for instance by bleeding air into the bypass duct 42, may increase the gas flow temperature through the engine core 40 and thus increase the gas velocity at the exhaust nozzle 34, allowing for more engine thrust to be produced. The VGM control module 520 may thus be configured for adjusting the position and/or orientation of the various VGMs to increase the thrust of the engine 100. In some embodiments, the engine thrust may be increased by approximately one or two percent, although other percent increases may be contemplated as well.

In some embodiments, a passive control scheme may be implemented in order to control the positions of the VGMs when discharging additional bleed air into the bypass duct 42. In such cases, the VGM control module 520 (or the controller 110) may implement a predefined bleed schedule that may be selected as a function of operating conditions such as altitude, Mach number, fan speed and flight phase. Based on the above or other operating conditions, a predefined schedule for one or more VGMs to bleed air from the engine core 40 into the bypass duct 42 is applied when additional thrust is needed and a choked state of the exhaust nozzle 34 is confirmed. The sensors 510 may be operable for detecting engine parameters and/or aircraft parameters to select the suitable schedule to be applied for modulating the VGMs.

Figure 6:
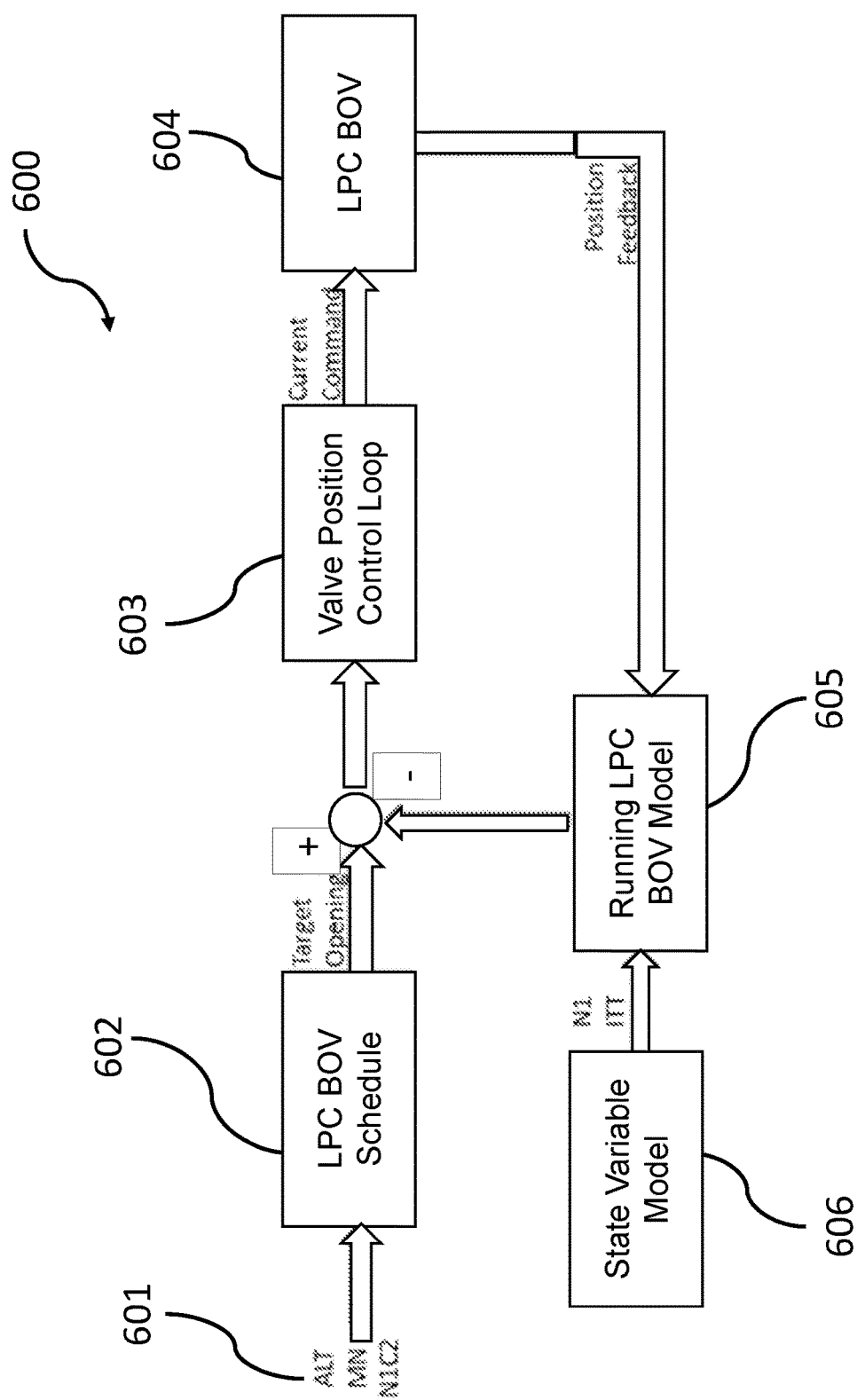
FIG. 6 is block diagram of an example active control scheme for modulating VGMs.

In some embodiments, an active control scheme may be implemented in order to control the positions of the VGMs when degrading the efficiency of one or more engine components. In such cases, modulating the VGM's may include determining a target position for the VGM's through a feedback loop based on at least one engine parameter. An example embodiment is illustrated in FIG. 6. In the example shown, the VGM to be modulated is an LPC bleed-off valve 604, although the active control scheme 600 is applicable to other VGMs. Engine and/or aircraft parameters 601 such as altitude (ALT), Mach Number (MN), and corrected fan speed (N1C2) are received. An LPC BOV schedule 602 is selected based on the received parameters 601, which may be received from the sensors 510 or from another measurement and/or computing device. The LPC BOV schedule 602 defines a target opening for the LPC BOV valve 604. A valve position control loop 603 issues a current command to the LPC BOV valve 604 based on the target opening and an input from an LPC BOV model 605. The LPC BOV model 605 is a simulation of the behavior of the LPC BOV valve 604 based on a state variable model 606 which provides fan speed (N1) and temperature (ITT) as inputs to the model 605. Also used as an input to the model 605 is the actual position of the LPC BOV valve 604. The valve position control loop 603 continues to issue a current command to the LPC BOV valve 604 until the target opening defined by the LPC BOV schedule 602 corresponds to the output of the model 605, at which point the target position of the valve 604 has been reached.

It will be understood that the example shown in FIG. 6 is a non-limiting and specific example used to show an exemplary implementation of an active control scheme. Other manners of modulating the VGM's to reach an optimal position for discharging core air into the bypass duct 42 (or otherwise degrading engine efficiency) are also contemplated.

Figure 7:
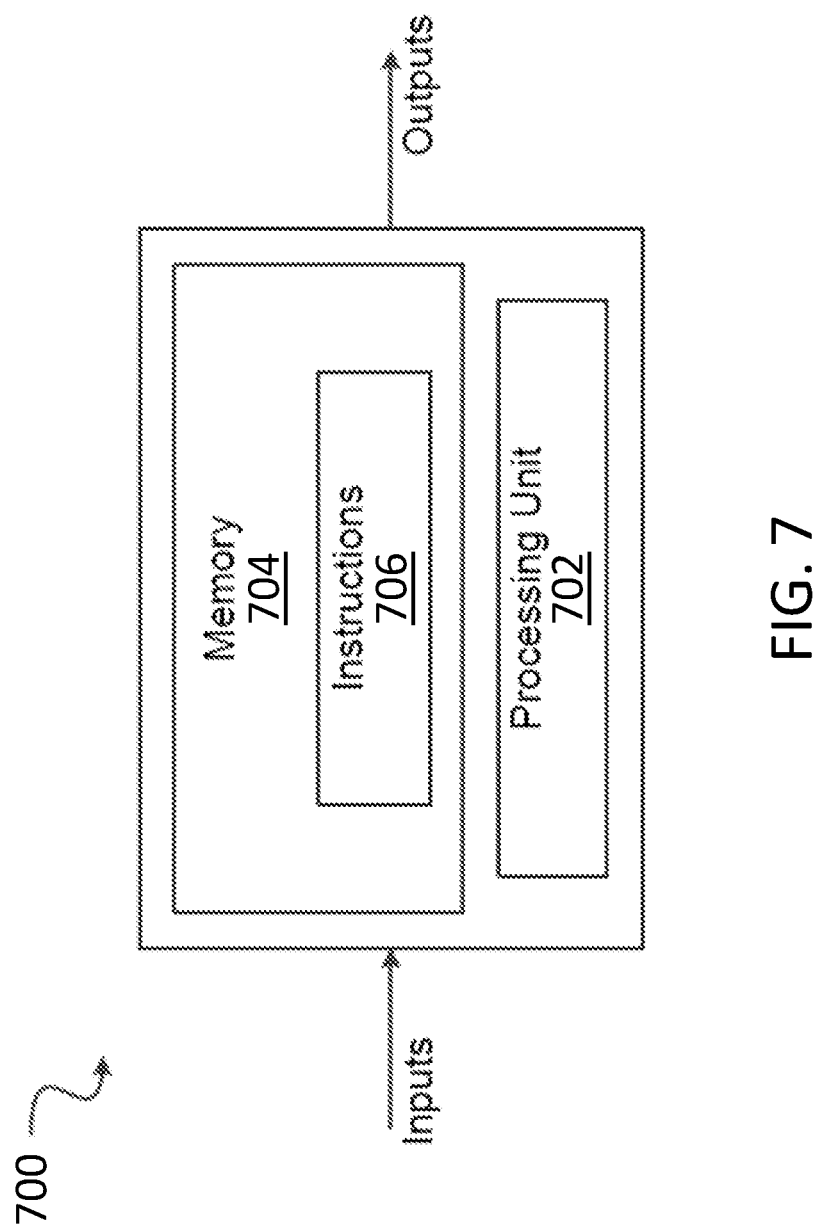
FIG. 7 is a block diagram of an example computing device.

With reference to FIG. 7, an example of a computing device 700 is illustrated. For simplicity only one computing device 700 is shown but the system may include more computing devices 700 operable to exchange data. The computing devices 700 may be the same or different types of devices. The controller 110 may be implemented with one or more computing devices 700. Note that the controller 110 can be implemented as part of a full-authority digital engine controls (FADEC) or other similar device, including electronic engine control (EEC), engine control unit (ECU), and the like.

The computing device 700 comprises a processing unit 702 and a memory 704 which has stored therein computer-executable instructions 706. The processing unit 702 may comprise any suitable devices configured to implement the method 400 such that instructions 706, when executed by the computing device 700 or other programmable apparatus, may cause the functions/acts/steps performed as part of the method 400 as described herein to be executed. The processing unit 702 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 704 may comprise any suitable known or other machine-readable storage medium. The memory 704 may comprise non-transitory computer readable storage medium, for example, but not limited to, an electronic, magnetic, optical, electromagnetic, infrared, or semiconductor system, apparatus, or device, or any suitable combination of the foregoing. The memory 704 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 704 may comprise any storage means (e.g., devices) suitable for retrievably storing machine-readable instructions 706 executable by processing unit 702.

The methods and systems for operating the engine 100 described herein may be implemented in a high level procedural or object oriented programming or scripting language, or a combination thereof, to communicate with or assist in the operation of a computer system, for example the computing device 700. Alternatively, the methods and systems for operating the engine 100 may be implemented in assembly or machine language. The language may be a compiled or interpreted language. Program code for implementing the methods and systems for operating the engine 100 may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating the engine 100 may also be considered to be implemented by way of a non-transitory computer-readable storage medium having a computer program stored thereon. The computer program may comprise computer-readable instructions which cause a computer, or more specifically the processing unit 702 of the computing device 700, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for operating an engine, the engine having an engine core, an exhaust nozzle, and variable geometry mechanisms, the method comprising:
   receiving a request for an increase in thrust generated by the engine;
   in response to receipt of the request, determining that at least one operating condition for engine degradation thrust is met;
   in response to the determining, modulating the variable geometry mechanisms to degrade an efficiency of the engine, thereby increasing a temperature of core air flowing through the engine core; and
   generating the increase in thrust from the increased temperature of the core air flowing through the engine core and into the exhaust nozzle;
   wherein the at least one operating conditioning for engine degradation thrust comprises a choked state of the exhaust nozzle.

2. The method of claim 1, wherein modulating the variable geometry mechanisms comprises discharging the core air from the engine core into a bypass duct of the engine.

3. The method of claim 2, wherein discharging the core air from the engine core into the bypass duct comprises discharging low or high pressure compressor bleed air into the bypass duct.

4. The method of claim 1, wherein determining the choked state of the exhaust nozzle comprises at least one of a minimum aircraft altitude, a Mach number, a rotational speed of the engine, and a flight phase.

5. The method of claim 1, wherein modulating the variable geometry mechanisms comprises increasing a gap between tips of high pressure turbine blades and a surrounding casing.

6. The method of claim 1, wherein modulating the variable geometry mechanisms comprises applying a predefined schedule to the variable geometry mechanisms.

7. The method of claim 1, wherein modulating the variable geometry mechanisms comprises determining a target position for the variable geometry mechanisms.

8. The method of claim 7, wherein the target position is determined through a feedback loop based on at least one engine parameter.

9. The method of claim 8, wherein the at least one engine parameter comprises an inter-turbine temperature of the engine.

10. A system for operating an engine, the engine having an engine core, an exhaust nozzle, and variable geometry mechanisms, the system comprising:
    a processor; and
    a non-transitory computer-readable medium having stored thereon program instructions executable by the processor for:
      receiving a request for an increase in thrust generated by the engine;
      in response to receipt of the request, determining that at least one operating condition for engine degradation thrust is met;
      in response to the determining, modulating the variable geometry mechanisms to degrade an efficiency of the engine, thereby increasing a temperature of core air flowing through the engine core; and
      generating the increase in thrust from the increased temperature of the core air flowing through the engine core and into the exhaust nozzle;
      wherein the at least one operating condition for engine degradation thrust comprises a choked state of the exhaust nozzle.

11. The system of claim 10, wherein modulating the variable geometry mechanisms comprises discharging the core air from the engine core into a bypass duct of the engine.

12. The system of claim 11, wherein discharging the core air from the engine core into the bypass duct comprises discharging low or high pressure compressor bleed air into the bypass duct.

13. The system of claim 10, wherein determining the choked state of the exhaust nozzle comprises at least one of a minimum aircraft altitude, a Mach number, a rotational speed of the engine, and a flight phase.

14. The system of claim 10, wherein modulating the variable geometry mechanisms comprises increasing a gap between tips of high pressure turbine blades and a surrounding casing.

15. The system of claim 10, wherein modulating the variable geometry mechanisms comprises applying a predefined schedule to the variable geometry mechanisms.

16. The system of claim 10, wherein modulating the variable geometry mechanisms comprises determining a target position for the variable geometry mechanisms.

17. The system of claim 16, wherein the target position is determined through a feedback loop based on at least one engine parameter.

18. The system of claim 17, wherein the at least one engine parameter comprises an inter-turbine temperature of the engine.

* * * * *